Jan. 15, 1952     W. L. MORRISON     2,582,789

FOOD FREEZING APPARATUS

Filed Nov. 10, 1947     3 Sheets-Sheet 1

Inventor
Willard L. Morrison
by Parker & Carter
Attorneys

Jan. 15, 1952    W. L. MORRISON    2,582,789
FOOD FREEZING APPARATUS

Filed Nov. 10, 1947    3 Sheets-Sheet 2

Inventor
Willard L. Morrison
by
Attorneys

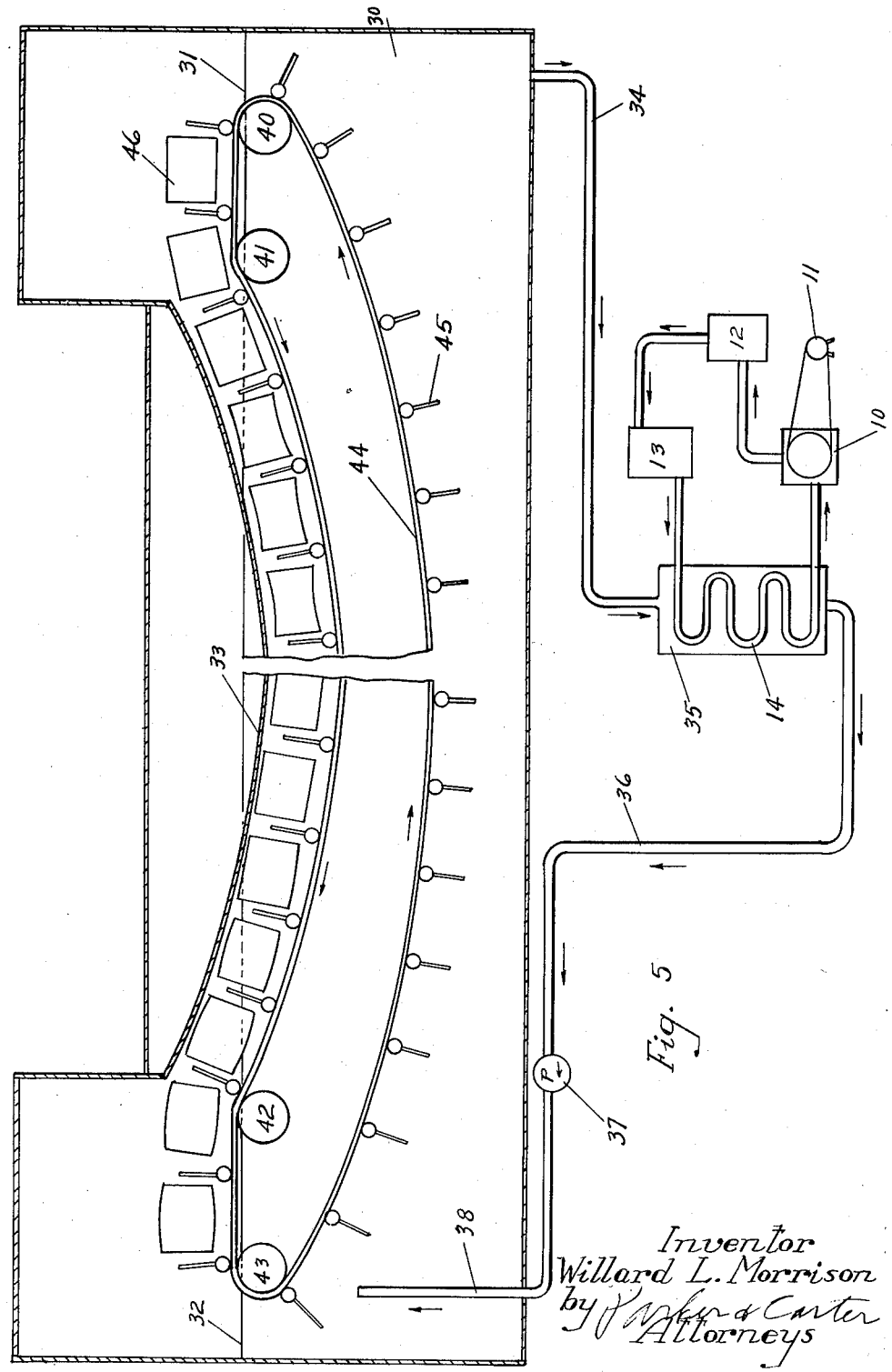

Patented Jan. 15, 1952

2,582,789

UNITED STATES PATENT OFFICE 2,582,789

FOOD FREEZING APPARATUS

Willard L. Morrison, Highland Park, Ill.

Application November 10, 1947, Serial No. 784,953

1 Claim. (Cl. 62—104)

My invention relates to improvements in apparatus for and method of preparing frozen food for shipment.

One object of the invention is to provide means for freezing foods and the like in containers or tote boxes.

Another object is to provide a continuous system and apparatus for preparing a continuous series of foods for frozen shipment.

Other objects will appear from time to time in the specification and claim.

My invention is illustrated more or less diagrammatically in the accompanying drawings, wherein:

Figure 5 is a diagrammatic section through a modified form of the device.

Like parts are indicated by like characters in the specification and drawings.

Figure 1:
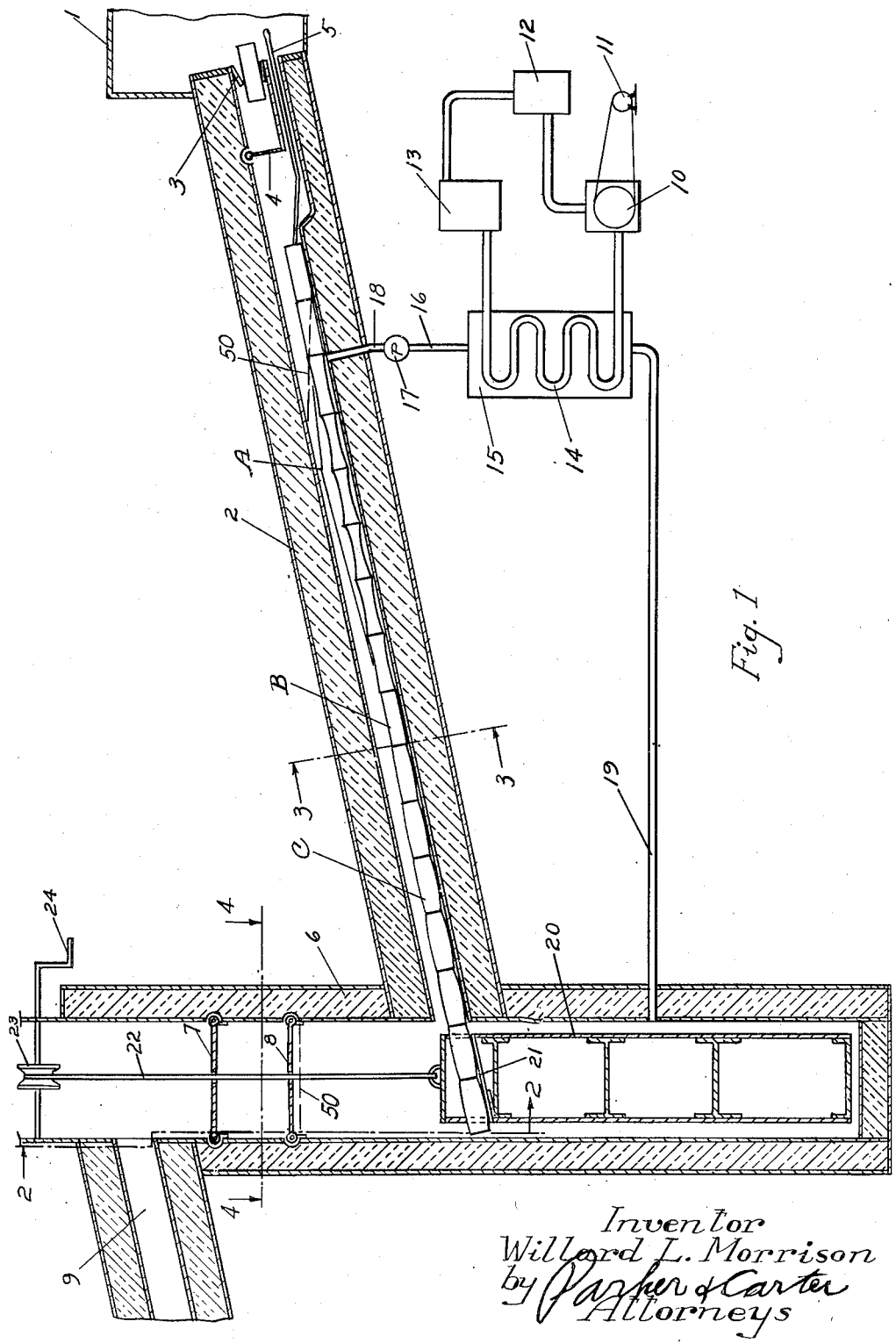
Figure 1 is a diagrammatic section through an apparatus for carrying out my invention.
Figure 2:
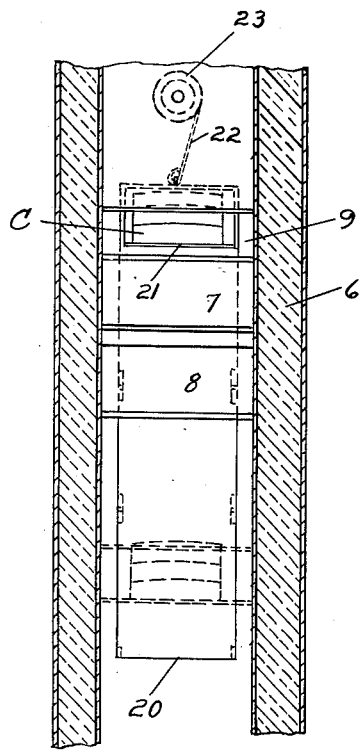
Figure 2 is a section along the line 2—2 of Figure 1.
Figure 3:
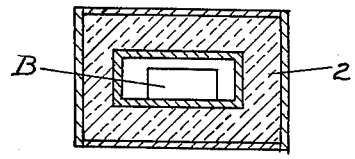
Figure 3 is a section along the line 3—3 of Figure 1.
Figure 4:
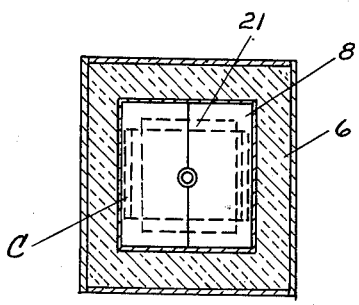
Figure 4 is a section along the line 4—4 of Figure 1.

Referring first to Figure 1, 1 indicates a loading chamber to which there may be brought by any suitable means a continuing series of separate tote boxes, preferably metallic, which contain a group of cartons of food prepared for freezing and shipment. Extending laterally from this loading chamber 1 is an insulated freezing tunnel 2. Flexible diaphragms 3 and 4, providing an air box, close the upper end of the tunnel. 5 is a reciprocating push rod driven by any suitable means not here shown, to reciprocate in a direction parallel with the axis of the tunnel. The tunnel discharges at its other end into an insulated boot 6, closed at the bottom and provided with a pair of flexible diaphragms 7, 8 defining an air box toward the top of the boot. Immediately above the diaphragm 7 is an insulated discharge tunnel 9 leading to any suitable point where shipment of the tote boxes may be effectuated. 10 is a compressor, 11 a motor, 12 a condenser, 13 a reservoir, and 14 an evaporator of any suitable type of freezing machine. The evaporator is contained within a housing 15 adapted to contain any suitable type of fluid such as brine or the like which will be cooled by the evaporator 14. 16 is a pipe leading from the reservoir 15, to a pump 17, which discharges through a pipe 18 to the interior of the tunnel 2 so that the coolant circulates through the tunnel down into the boot 6 and back through the pipe 19 to the reservoir 15, there being thus continuous circulation of coolant through the tunnel, such coolant having been cooled by heat exchange with the evaporator 14 to the end that the temperature of the coolant is below the temperature at which the food is to be frozen. The liquid level of the coolant will be substantially that of the discharge end of the pipe 18.

20 is an elevator adapted to reciprocate in the boot 6 back and forth through the air box defined between the diaphragms 7 and 8. This elevator has a tote-box-supporting platform 21 parallel with the floor of the tunnel 2, and may be raised and lowered by means of a cable 22 wound about a pulley 23 and adapted to be operated by any suitable means diagrammatically suggested by the crank 24. When the parts are in the position shown in Figure 1, the platform 21 is in alignment with the floor of the tunnel. When the elevator 20 is raised until the platform 21 is in alignment with the floor of the discharge tunnel 9, the side of the elevator masks the lower end of the tunnel 2.

Tote boxes are introduced one at a time by hand or by machinery, as the case may be, into the upper end of the tunnel. They travel down by gravity until they reach the level of the liquid. It will be noted that the tote boxes are shown substantially rectangular because they are of sufficient strength and thickness to maintain this rectangular shape when filled with the series of food-containing cartons. The plunger 5 reciprocates to push the series of tote boxes down beneath the level of the coolant, the coolant being frequently of higher specific gravity than the tote box and contents. As the tote boxes are pushed below the level of the liquid coolant, the pressure of the coolant tends to collapse the tote boxes against the cartons contained therein as suggested in the area indicated at "A." As the freezing takes place, the food will of course shrink to some extent, thus removing the support from the tote box and allowing this shrinkage of the box itself under hydrostatic pressure to take place until, as the liquid contents of the food cartons expand in freezing, the tote box will resume its rectangular shape as at "B" and will subsequently actually expand as at "C," such expansion being permitted by the flexible walls of the tote box. The reciprocating member 5, being yieldingly operated, will continue to reciprocate until a sequence of tote boxes has been pushed down through the tunnel to enter the boot 6. One or more of the boxes will be forced into the boot and into engagement with the platform 21 of the elevator 20. When the elevator is raised, the next tote box in the series will be held against the yielding pressure of the member 5 by the wall of the elevator 20. The elevator rises until it is in register with the tunnel 9, when the tote box slides off by gravity through the tunnel 9 and finds its way to the shipping platform or storage place. The elevator will be lowered to take its next load. This continues as long as tote boxes are fed to the top and removed from the bottom.

An important factor here, of course, is the necessity of preventing the deposition of frost on the tote boxes after they are frozen. As they come into the loading room 1 they are at room temperature, and there is no tendency toward frost formation. When they are introduced into the tunnnel, they are frozen, and if air were allowed to enter the tunnel, frost would be deposited on the boxes, and water, snow or frost might find its way into the solution itself. Hence the necessity for the pair of diaphragms at the upper end of the tunnel to provide an air lock. Little, if any, air, and no moisture, will enter the tunnel then through the upper end.

The same provision is provided at the discharge end with respect to the boot, because here again the air lock prevents the entrance of air to the lower end of the tunnel through the discharge boot, and the deposit of frost on the outside of the frozen tote box after it has left the system is of lesser moment. But in each case the air lock is necessary to prevent movement of air into and through the tunnel.

In the modified form shown in Figure 5, instead of a downwardly inclined tunnel, a reservoir 30 is provided, having at one end a loading floor 31, at the other end a discharge floor 32. The level of the coolant liquid will normally be just below the floor 32, so that the tote boxes will, for a substantial part of their travel, be totally immersed. Between these two floors is a downwardly curved wall 33 at a level such that it will be immersed in the liquid contained in the reservoir 30 intermediate the floors 31 and 32. The coolant circulates through the pipe 34, heat exchange reservoir 35, pipe 36, pump 37, pipe 38 to the freezing reservoir 30. Again the motor 11, reservoir 35, compressor 10, condenser 12, receiver 13 and evaporator system 14, just as in the device shown in Figure 1, is needed to cool the coolant down to a point at which the liquid in the cooling tank will cool the material being treated.

40, 41, 42, 43 are sprockets over which travels a belt or chain 44 having a series of propeller blades 45. The belt hangs between the pulleys 41 and 42, being guided and supported, if desired, by means not here shown, as they form no part of the invention, so that individual tote boxes 46 loaded on the belt are carried in the direction of the arrows, being immersed beneath the level of the coolant liquid until freezing takes place, when the frozen and expanded tote box will be received at the opposite end on the receinving floor 32 for suitable disposal.

It will be understood that the mechanisms here shown are purely diagrammatic, that they merely illustrate any suitable type of machinery for carrying out my process, and that other mechanisms might equally well be used.

The level of the liquid in Figure 1 is shown at 50. The diaphragms 4, 7 and 8 are pivoted as shown and free to swing when the tote boxes or the elevator carriage 20 are to move past them. The details of these diaphragms form no part of the invention and therefore their showing is diagrammatic.

The rod 5 may be reciprocated by hand. If desired, machinery might be used but that also forms no part of my invention so the showing is entirely diagrammatic. The same is true of the blades 45. Circular members between them and the conveyor belt or chain 44 serve merely to fasten the blades to the belt so that they may propel the tote boxes through the bath.

The tote boxes are introduced into and removed from the freezing chamber of Figure 5 by hand or on trucks or by machinery as the case may be. The door through which the workman enters and leaves the chamber and through which the tote boxes are introduced and removed is not illustrated since its details form no part of the present invention.

I claim:

Means for freezing food comprising a downwardly inclined tunnel, a loading room at the upper end of the tunnel, an air lock in the tunnel communicating with the loading room adapted to permit the introduction into the tunnel of food containers to be frozen, means for circulating a liquid coolant through the tunnel and for maintaining the level of the coolant such that the tunnel, for a portion of its length, is entirely filled with the liquid, means for maintaining the temperature of the liquid at a point below the point at which food is to be frozen, means at the lower end of the tunnel for withdrawing food containers from the liquid, said means including an elevator adapted to receive a food container, means for raising the elevator, the elevator having a shield adapted to mask the end of the tunnel to prevent discharge of additional food containers while the elevator is raised, an air lock through which the elevator passes with its load of food containers, the elevator having an inclined platform parallel with the floor of the tunnel, a discharge passage adjacent the upper excursion of the elevator, the floor of which is parallel with the tunnel, the passage being located above the liquid level.

WILLARD L. MORRISON.

REFERENCES CITED

The following references are of record in the file of this patent:

UNITED STATES PATENTS

| Number | Name | Date |
|---|---|---|
| 1,898,758 | Bottoms | Feb. 21, 1933 |
| 1,907,649 | Mark | May 9, 1933 |
| 1,944,857 | Atwell | Jan. 23, 1934 |
| 2,019,551 | Varney | Nov. 5, 1935 |
| 2,237,255 | Finnegan | Apr. 1, 1941 |
| 2,475,077 | Clancy | July 5, 1949 |
| 2,484,297 | Klein | Oct. 11, 1949 |